UNITED STATES PATENT OFFICE 2,578,623

CONCENTRATION OF THORIUM

George F. Asselin, Kankakee, and Ludwig F. Audrieth, Urbana, Ill., assignors to United States of America as represented by the Secretary of the Navy No Drawing. Application May 27, 1948, Serial No. 29,665

12 Claims. (Cl. 23—14.5)

This invention relates to the separation and concentration of thorium, characterized by its preferential extraction from aqueous solutions containing thorium and the rare earth elements. The invention is more particularly described as a novel process or procedure extracting thorium preferentially by means of certain immiscible or partially immiscible organic solvents from solutions containing thorium and the rare earth metal salts, provided, that to such solutions, an alkali or ammonium salt of thiocyanic acid is added, prior to a treatment with organic solvents of the class more specifically described hereafter.

An important object of the invention is to provide a new and improved method and procedure for the extraction, separation and concentration of thorium.

A further object of the invention is to recover thorium from a mixture of rare earths by preferential extraction using certain immiscible or partially immiscible organic solvents, by the addition of an alkali or ammonium salt of thiocyanic acid.

It is well known that certain organic solvents which are completely or incompletely immiscible with water, are able to extract preferentially certain dissolved solutes from aqueous solutions. Such methods have been widely used for the extraction of organic compounds, but in only a few cases have such procedures been used for the separation and concentration of inorganic substances. For instance, ferric chloride or iodine may be extracted from an aqueous solution using ether. Of more importance is the extraction of uranyl nitrate from an aqueous solution by ether.

Reference is also made to the separation of rare earths by differences in the distribution ratios between the organic solvents and water solutions. Because of the marked similarity of the rare earths, comprising some sixteen different elements, such procedures are not particularly successful and hardly can be considered as practical. Rare earth ores, such as monazite, contain varying but appreciable quantities of thorium, and monazite constitutes the principal source of thorium. Present methods involving the separation of thorium from the rare earths now involve laborious chemical processes. Considerable quantities of materials as reagents must be handled with consequent losses of valuable products throughout the processing steps.

To those familiar with the chemistry of these elements, it would naturally have seemed obvious to attempt concentration and separation by processes of liquid extraction. If a readily available solvent such as butyl alcohol is used, for instance, distribution of the rare earths and thorium between the aqueous and non-aqueous phase does occur, but the differences in extractibility are so slight as to make questionable the utility of such an extraction process. The distribution of the various rare earths and thorium between aqueous solutions and butyl alcohol, for instance, indicates that the extractibility is approximately in the following order:

$$Nd > Y > Er > Yb > Th$$
$$Nitrates > Chlorides$$

The differences between the individual rare earths, and actually the difference between the rare earths and thorium, are so slight as to make it virtually impossible to achieve any sort of an economical separation. Actually, the data demonstrate that thorium is extracted least readily under these conditions.

While the simple salts such as the nitrates of these elements do not lend themselves readily to separation by liquid-liquid extraction processes, it is significant that the addition of thiocyanate not only reverses the order of extractibility of rare earths as opposed to thorium but in addition favors the preferential extraction of thorium. We had expected greater solubility of both rare earths and thorium in the non-aqueous phase by increasing the concentration of ammonium thiocyanate. We were however, quite surprised to find that the solubility of thorium was enhanced far beyond our expectations, so that in the presence of ammonium thiocyanate it was extracted to a much greater degree than any of the rare earths, while in the absence of thiocyanate it was least readily extracted.

This specific effect of thiocyanate in increasing the relative extractibility of thorium as opposed to the rare earths, now makes it possible in a relatively few steps to increase the thorium content in such an extract so that practically no rare earth is present in the organic phase and only a negligible amount of thorium is present in the aqueous phase.

While there are a considerable number of alcohols, ketones and esters, and the like, which could be used to achieve this preferential extraction, we have found it advantageous to employ either butyl or amyl alcohol, first because they are only slightly soluble in water at ordinary temperatures; secondly, because they are available in quantity at a reasonable price; and thirdly, because these solvents exhibit relatively high solubility for thorium salts. This last factor is of considerable importance, since it eliminates the necessity of handling large volumes of organic solvent. These solvents may also be recovered rather easily in the employment of a continuous process such as would represent a logical engineering development in extending our process to a large scale technical endeavor.

In carrying out this invention as a process for the enrichment of thorium, there are brought into intimate contact (1) an aqueous solution containing thorium and one or more rare earth metal salts, to which has been added a thiocyanate such as ammonium thiocyanate; and (2) an aliphatic alcohol, such as butyl or amyl alcohol containing at least four carbon atoms. This is followed by the separation of the alcohol layer from the aqueous layer, removal of the alcohol, and recovery of the solid product, from the alcohol extract, which contains a higher proportion of thorium to rare earth over that originally present.

In further disclosing the invention, typical results of separations effected in mixtures containing varying proportions of thorium salt and a rare earth salt are presented in tabular form. Neodymium is used as a typical example of a member of the rare earth series. Conventional batch, or counter-current extraction procedures may be set up making use of the data presented.

TABLE I

*Extraction of 40 ml. samples of neodymium and thorium nitrates containing 0.0594 mols. ammonium thiocyanate to 75 ml. n-amyl alcohol*

| Initial Per Cent Th (dry basis) | Equilibrium Concentration | | | | Per Cent Th After Extraction | |
|---|---|---|---|---|---|---|
| | Aqueous-phase | | Alcohol-phase | | | |
| | g. Nd/l. | g. Th/l. | g. Nd/l. | g. Th/l. | Aqueous Phase | Alcohol Phase |
| 66.7 | 7.09 | 5.56 | 1.37 | 6.60 | 44.0 | 82.9 |
| 66.7 | 13.6 | 12.80 | 1.88 | 12.12 | 48.5 | 86.7 |
| 66.7 | 22.2 | 20.6 | 2.12 | 21.0 | 48.2 | 91.0 |
| 33.3 | 11.9 | 3.80 | 2.70 | 2.22 | 8.1 | 45.1 |
| 33.3 | 26.2 | 8.05 | 4.24 | 6.75 | 23.5 | 61.3 |
| 33.3 | 46.8 | 12.50 | 5.77 | 9.69 | 23.0 | 62.7 |

| | | | | | Equilibrium Distribution Ratios, Concentration in alcohol to Concentration in water | |
|---|---|---|---|---|---|---|
| 0 | 7.04 | 0 | 1.00 | 0 | 0.14 | |
| 0 | 22.6 | 0 | 2.50 | 0 | .11 | |
| 0 | 15.0 | 0 | 1.71 | 0 | .11 | |
| 0 | 30.7 | 0 | 3.14 | 0 | .10 | |
| 100 | 0 | 2.41 | 0 | 2.88 | 1.2 | |
| 100 | 0 | 6.48 | 0 | 5.05 | 0.77 | |
| 100 | 0 | 10.4 | 0 | 7.29 | .71 | |
| 100 | 0 | 15.0 | 0 | 9.40 | .62 | |
| 100 | 0 | 27.4 | 0 | 11.9 | .44 | |
| 100 | 0 | 48.2 | 0 | 15.3 | .32 | |

We observed that thorium nitrate is extracted to a lesser extent in butyl alcohol than any of the rare earths studied, and presumably this would also hold in amyl alcohol. However, in the presence of thiocyanate, it is extracted to a much greater extent in amyl alcohol than any of the rare earths studied. From this difference it appeared that thorium could be very easily separated from the rare earths.

To show the reversal of the order of extractibility of thorium compared with the rare earths upon the addition of thiocyanate, data are presented in Table II on the distribution of these materials between water and butyl alcohol. An appreciation of the advantages of the thiocyanate process is gained most quickly by comparing the tabulated distribution ratios in each of the two tables.

It should be pointed out that other rare earths resemble neodymium with respect to distribution between water and a non-aqueous solvent, both in the presence and absence of ammonium thiocyanate.

TABLE II

*Distribution of Neodymium and Thorium Nitrates Between Water and n-Butyl Alcohol*

| Material | Equilibrium Concentration, g./l. | | Equilibrium ratio, Concentration in alcohol to concentration in water |
|---|---|---|---|
| | Aqueous Phase | Alcohol Phase | |
| Nd | 47.5 | 1.51 | 0.032 |
| Nd | 48.3 | 1.80 | 0.037 |
| Nd | 9.95 | 0.210 | 0.021 |
| Nd | 19.8 | 0.526 | 0.027 |
| Nd | 29.3 | 0.857 | 0.029 |
| Th | 27.2 | 0.43 | 0.016 |
| Th | 37.9 | 0.716 | 0.019 |
| Th | 55.3 | 1.359 | 0.026 |

In Table II the equilibrium ratios are less with respect to thorium than to neodymium, and from Table I it will be apparent that the equilibrium ratios for thorium are much greater, averaging two or three times as much, or more, in many cases.

Thus appreciable concentration of thorium is obviously obtained in such single batch extractions. Repetition of batch extractions using either butyl or amyl alcohol makes it possible to achieve a high degree of concentration. On the basis of the distribution ratios presented above, only a relatively few extractions would be needed to accomplish complete removal of the thorium from an aqueous solution to give a product essentially free from rare earths. A continuous countercurrent process, as practiced technically, may be used rather than single batch extractions. The distribution ratios presented in the above tables give the necessary data to design installations for accomplishing such separation upon a continuous basis.

A specific example will serve to illustrate the advantages to be gained by use of a process of liquid extraction for concentration of thorium. Forty ml. of an aqueous solution of nitrates of thorium and neodymium containing on a metal basis 1.26 grams thorium and 0.632 gram neodymium, together with 4.52 grams ammonium thiocyanate, was shaken at room temperatures with 75 ml. of n-amyl alcohol. The aqueous solution contained a 2:1 ratio of thorium to neodymium on a metal weight basis prior to extraction. After equilibrium had been achieved, the system was found to separate into two liquid phases consisting of 30.8 ml. of aqueous solution and 84.8 ml. alcohol solution. The alcohol was removed from the alcoholic phase by steam distillation, and the resulting extract treated with ammonium hydroxide to precipitate the mixed oxides. Analysis of the mixed oxides showed that this material contained 1.03 grams thorium and 0.15 gram neodymium, both calculated on a metal basis. Not only was 81.8% of the thorium removed from the aqueous phase by this extraction process, but the ratio of thorium to neodymium in the non-aqueous phase had now been increased to 6.3:1. Whereas the original mixture consisted of 66.7% thorium and 33.3% neodymium calculated on a dry basis, the extract of the aqueous solution contained 86.7% thorium and only 13.3% neodymium.

This is a most remarkable increase in concentration of thorium in a single step batch separation and far superior to anything which can be attained by ordinary processes of fractional crystallization. Reference is made to Table I, in which similar and equally striking results are attained by our process of liquid-liquid extraction. The data in Table I demonstrate furthermore that more profound enrichment can be obtained, up to a limit, as the concentration of salts in the aqueous phase increases. While such batch extractions could be repeated to eventually give essentially pure thorium, it should be pointed out that a commercial procedure would make use of continuous counter-current extraction resulting in the removal from the top of an extraction column of essentially pure thorium in the non-aqueous phase, whereas an aqueous effluent would be taken from the bottom of the column consisting essentially of an aqueous solution of rare earths. The data indicate furthermore that relatively few theoretical extraction steps would be involved in achieving substantially complete concentration and separation of the thorium from a thorium-neodymium mixture.

It is pointed out that cerium, one of the rare earths always present in the rare earth-thorium mixtures as obtained commercially, must be reduced to the cerous stated. Such agents as hydrogen peroxide, hydrazine, and the like may be used for this purpose. If the cerium is present in the higher valent state, undesirable solid by-products are obtained by reaction with the thiocyanate.

The beneficial effects of ammonium thiocyanate in promoting the preferential extractibility of thorium have been observed, even if the thiocyanate is present only in equimolar ratios to that of the rare earths and thorium. We find, however, that it is desirable to use molar ratios of thiocyanate to metal ions of the order of 4:1 to 6:1.

It is emphasized that the rare earth-thorium mixture may be converted into any conveniently soluble salt such as the chloride or nitrate. It is then merely necessary to add to such an aqueous solution the appropriate quantity of ammonium thiocyanate and then to proceed with the extraction by means of either butyl or amyl alcohol. We prefer operation over ordinary temperature ranges, since at higher temperatures the solubility of the extractant in the aqueous phase increases markedly.

Although a preferred method of carrying out this invention has been described in some details, it should be regarded as an illustration or example and not as a restriction or limitation, as many changes may be made in the specific ingredients and in the method or process of practicing the invention without departing from the spirit and scope thereof.

We claim:

1. A process for the extraction of thorium from an aqueous solution containing thorium and rare earths and a soluble thiocyanate, by treatment with a water immiscible organic solvent.

2. A process for the extraction of thorium from an aqueous solution containing thorium and rare earths and a soluble thiocyanate, by treatment with an aliphatic alcohol containing at least four carbon atoms.

3. A process for the extraction of thorium from an aqueous solution containing thorium and rare earths and a soluble thiocyanate, by treatment with amyl alcohol as a water immiscible organic solvent.

4. A process for the extraction of thorium from an aqueous solution containing thorium and rare earths and a soluble thiocyanate, by treatment with butyl alcohol as a water immiscible solvent.

5. The process for the extraction of thorium from an aqueous solution containing thorium and rare earth salts, and ammonium thiocyanate, by treatment with a water immiscible organic solvent.

6. The process for the extraction of thorium from an aqueous solution containing thorium and rare earth nitrates, and ammonium thiocyanate, by treatment with a water immiscible organic solvent.

7. The process for the extraction of thorium from an aqueous solution containing thorium and rare earth chlorides, and ammonium thiocyanate, by treatment with a water immiscible organic solvent.

8. The process for the extraction of thorium from an aqueous solution containing thorium and rare earth salts, and ammonium thiocyanate, by treatment with an aliphatic alcohol containing at least four carbon atoms.

9. The process for the extraction of thorium from an aqueous solution containing thorium and rare earth salts and ammonium thiocyanate, in which the molar ratio of the thiocyanate to the metal ions is greater than 4:1, by treatment with a water immiscible organic solvent.

10. The process for the extraction of thorium from an aqueous solution containing thorium and rare earth metal salts and ammonium thiocyanate, in which the molar ratio of the thiocyanate to the metal ions is greater than 4:1, by treatment with an aliphatic alcohol containing at least four carbon atoms as a solvent.

11. A process for the enrichment of thorium, characterized by bringing into intimate contact an aqueous solution containing thorium and rare earth metal salts, ammonium thiocyanate, and an aliphatic alcohol containing at least four carbon atoms; separating the alcohol layer from the aqueous layer, removing the alcohol from its layer, and recovering the solid product from the alcohol layer containing a higher proportion of thorium to rare earth over that originally present.

12. The process of concentrating thorium from an aqueous solution containing thorium and rare earth metal salts, in admixture with ammonium thiocyanate in which the molar ratio of the thiocyanate to the metal ions is greater than 4:1 comprising the treatment of the mixture with an aliphatic alcohol containing at least four carbon atoms as a solvent; separating the alcohol layer from the aqueous layer; removing the alcohol phase and recovering the solid product containing a higher proportion of thorium to rare earth over that originally present; and returning this recovered solid product for repetitive action on a continuous basis to obtain the relative freedom of thorium from rare earths as desired.

GEORGE F. ASSELIN.
LUDWIG F. AUDRIETH.

REFERENCES CITED

The following references are of record in the file of this patent:

UNITED STATES PATENTS

| Number | Name | Date |
| --- | --- | --- |
| 2,227,833 | Hixson et al. | Jan. 7, 1941 |

OTHER REFERENCES

Williams: Cyanogen Compounds, pages 197, 202 and 211. Published in 1915 by J & A. Churchill, London.

Fischer et al.: Naturwissenschaften, volume 25, page 348 (1937).